United States Patent [19]

Cottrell

[11] Patent Number: 5,426,939
[45] Date of Patent: Jun. 27, 1995

[54] TORQUE CONVERTER HAVING AUTOMATIC POWER CONTROL

[76] Inventor: Harold L. Cottrell, P.O. Box 452, Defiance, Ohio 43512

[21] Appl. No.: 83,885

[22] Filed: Jun. 28, 1993

[51] Int. Cl.$^6$ ............... F16D 33/02; F16D 33/06
[52] U.S. Cl. ................................. 60/348; 60/357; 60/431
[58] Field of Search ............... 60/347, 348, 355, 357, 60/358, 431, 449

[56] References Cited

U.S. PATENT DOCUMENTS

| | | | |
|---|---|---|---|
| 3,485,042 | 12/1969 | McLean | 60/355 |
| 3,646,755 | 3/1972 | Sherman et al. | 60/355 X |
| 3,965,680 | 6/1976 | Cottrell | 60/357 |
| 4,426,845 | 1/1984 | Brooks et al. | 60/347 |
| 5,048,371 | 9/1991 | Hendriks | 60/355 X |

FOREIGN PATENT DOCUMENTS

| | | | |
|---|---|---|---|
| 0508528 | 10/1992 | European Pat. Off. | 60/358 |
| 1560848 | 4/1990 | U.S.S.R. | 60/358 |

Primary Examiner—Edward K. Look
Assistant Examiner—Hoang Nguyen

[57] ABSTRACT

An automatic sensing, measuring, and controlling system for varying the output power of a hydrokinetic device, such as a torque converter, having a varying power input derived from the output of an engine related to the power demand of the engine in an electrical/electronic closed loop circuit arrangement; comprising: circuitry for controlling the output power of the torque converter in response to the demand on the engine in operation, including, sensing and measuring the varying output power of the engine and applying the data measured to a sensor for converting the measured data to an indication representative of the varying output power of the engine; a power computer operable to relate the variable power indication to the load demand of the engine in operation. Control circuitry responsive from the power computer information to vary the output of the torque converter to the load demand of the engine. The power computer further comprising a data information bank.

8 Claims, 2 Drawing Sheets

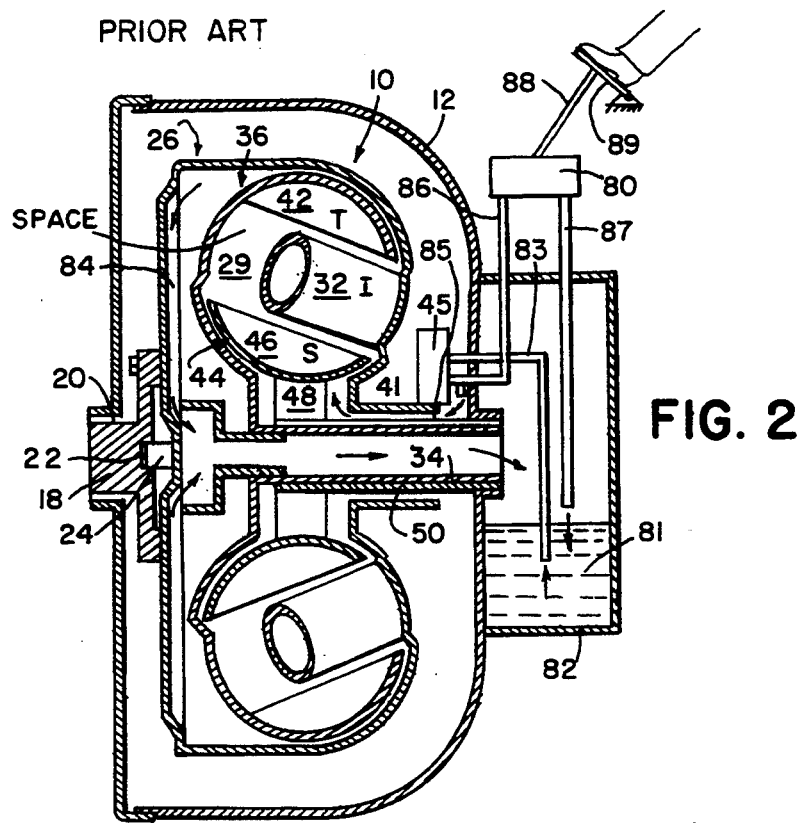

TORQUE CONVERTER HAVING AUTOMATIC POWER CONTROL

Hereintofore, in the utilization of a torque converter for the transmission of power to an engine, such as noted in the hydrokine-tic torque converter described in my prior patent U.S. Pat. No. 3,965,680, the actuation of the torque converter for the transmission of power is accomplished manually by the operator of the engine; as noted in my said prior patent, "xxx by depressing the pedal xx causes the control xxx". It is apparent even with a most skilled operator, the human body cannot respond to the varying load demands of the engine.

Further, in the off-road applications, a highly skilled operator is needed to maintain proper operation of a vehicle/machinery equipped with a torque converter, because of its fixed power capacity. That is, a highly skilled operator is needed for a torque equiped bulldozer during a bucket loading operation in that a close balance must be maintained between the power transferred in moving the bulldozer into the load for loading the bucket and the power used to raise the the bucket, so that, the total power required does not exceed the power available.

In other applications in the utilization of heavy machinery, such as in downhill coasting, the input and output are reversed so that now the turbine drives the impeller to provide engine breaking. The opposed heads developed by the turbines and impellers of prior torque converters and fluid couplings prevented such devices from developing the high engine breaking desired. Other disadvantages in the operation of these prior art devices are known to those skilled in the art.

SUMMARY OF THE INVENTION

The present invention, in its most simplified embodiment, is utilized with a torque converter of the hydrokinetic type described in detail in my aforesaid prior patent. It is understood, the automatic control system herein may be utilized with other torque converters, known to those skilled in the art.

The present invention is a system for measuring the output power of an electrical signal engine and utilizing the measured information to develop an indication representative of the varying output power of the engine. In the simplified embodiment, the varying output of the engine is sensed as the r.p.m. at the drive shaft. A sensor converts the r.p.m. information to a meaningful indication of variable power of the engine. This information may be equated to that "sensed" by the operator of the machinery or vehicle in a man operation. This developed indication is applied to a power computer operative to determine the the amount/degree of control actuation of the means to vary the output of the system. In this instance the amount of fluid in the space of the converter.

The power computer establishes a direct correlation between the amount of fluid in the converter to the power output at said engine shaft—the input to the converter. There is developed the instantaneous amount of fluid in the converter versus the instantaneous power need of the engine and thereby converting the information to a control signal to be applied to the pump or control device to vary the power in consonance with the varying power need of the engine utilized by the operator.

It is accordingly, a principal OBJECT of the present invention to provide a torque converter having control means for varying the output power therefrom.

It is another OBJECT of the present invention to provide sensing and measuring means to determine the instantaneous power need of an engine responsive to said torque converter.

A further OBJECT of the present invention is to convert the power need of said engine to an indicative control signal.

Another OBJECT of the present invention is to utilize said con-control signal to automatically and instantaneously vary the output power of said converter in response to the instantaneous power need of said engine.

Other OBJECTS and features of the present invention will become apparent from the following detailed description when taken in conjunction with the drawings in which:

BRIEF DESCRIPTION OF THE DRAWINGS

FIG. 2 is an overall schematic illustration of the torque con-of FIG. 1 in a cross-sectional view, illustrating an operator manual operation FIG. 4 is a crossectional view of FIG. 2 further comprising the present invention for the automatic control of output power.

OVERALL REVIEW OF U.S. PAT. NO. 3,965,860

Figure 1:
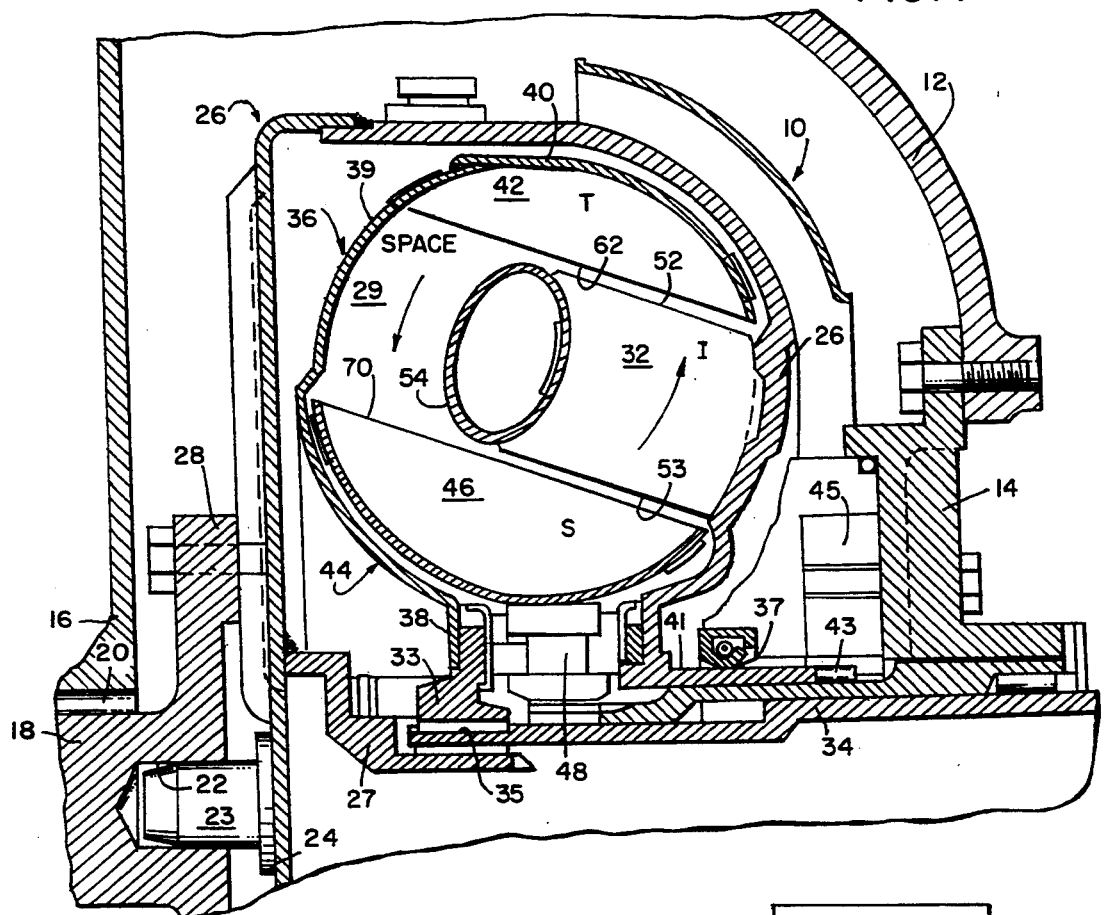
FIG. 1 is a fragmentary cross-sectional view of a hydrokine-tic device of the torque converter type of my prior U.S. Pat. No. 3,965,680.

Prior to a detailed description of the present invention, it is deemed expedient that there be an understanding of a torque converter having means for controlling the output power therefrom in response to the operational demands of an engine. Accordingly, reference is now made to FIG. 1 herein, and being FIG. 1 of the prior art taken from aforesaid patent. The engine drive shaft 18, which is mounted in bearing 20, has a pilot opening 22. The torque converter 10 has an input shaft 24 with a pilot opening 23 that is received in the pilot opening 22 and driven by shaft 18.

With reference to FIG. 2 also FIG. 2 of the prior art taken from my aforesaid patent, means for draining or emptying and filling the space 29 provided by the torque converter 10, comprises a supply system having a control unit or modulator 80, a pump 45 and a reservoir 81 connected to the pump by line 82 and a return system the line 84 for returning fluid to the reservoir, located in the bottom part of the transmission case. The pump discharge is connected to a line 85 which supplies fluid to the converter 10. The line 85 has a branch 86 connected to the modulator 80, the modulator having a return line 87 for returning fluid to the reservoir 81. In operation, the control unit may be connected by various means, such as the linkage 88 connected to the throttle pedal 89 of machine. In this way the the emptying of the fluid from the impeller shell 26 may be controlled by the machine operator, through the conventional accelerator pedal.

Normally, the fluid flows from the reservoir 81 to the pump 45 and into the torque converter 10 in the space 29 provided and back to the reservoir 81.

When neutral or increased horsepower is desired, depressing the pedal 89 causes the control unit 80 to open and permit some of the fluid discharged from the pump 45 to flow through the lines 86 and 87, while fluid is permitted to empty from the converter 10. As an alternative, the draining could be accomplished by pumping the fluid from the impeller shell or the control accomplished by connecting the suction side of the pump to the drain line instead of the supply line.

At neutral, about 98% of the fluid is emptied from the torus portion of the converter 10, leaving just enough for lubrication purposes. In this state, almost no power is transferred between the impeller and turbine or vice versa.

At variable power capacity, the percentage of fluid entering the torus portion of the converter 10 is reduced. When the torque converter 10 is operated at partially filled condition, it permits the prime mover to deliver more horsepower to the impeller, as compared to a fully filled condition.

With the output speed of the turbine shaft 34 other than zero, the increase input power results in a higher output torque delivered by the turbine, and the torque is consequently also higher over a broader range of operation than would normally be developed at a full fluid level.

DETAILED DESCRIPTION OF THE INVENTION

With specific reference to FIG. 1, there is illustrated in block schematic, the automatic electrical/electronic closed loop control system of the present invention in its most simplified form.

Figure 3:
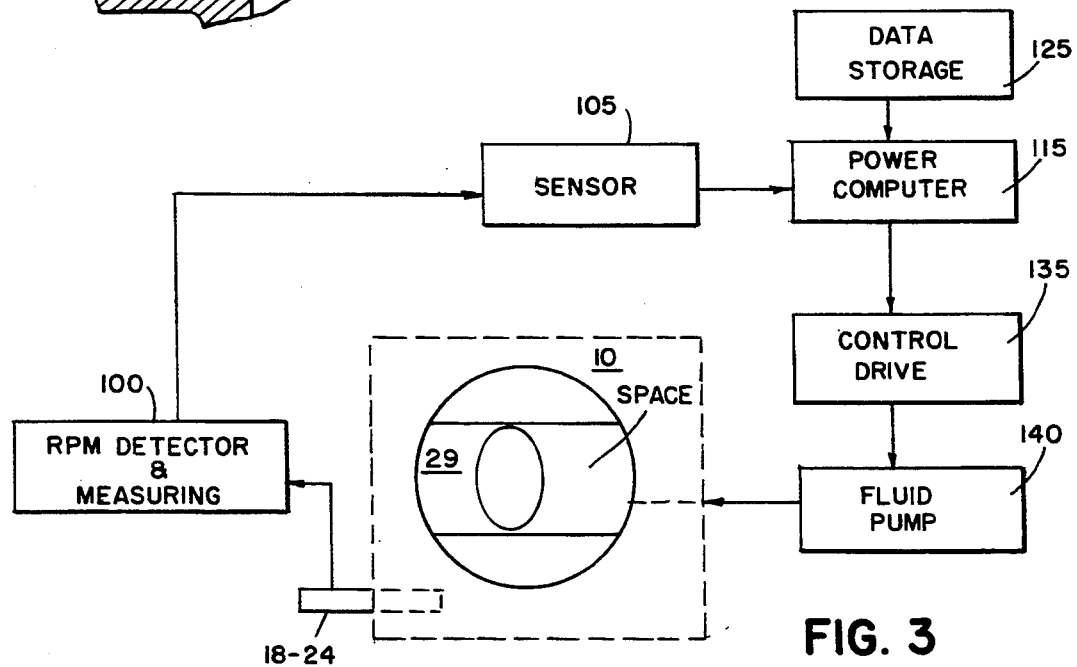
FIG. 3 is a block schematic illustration of the present invention its most simplified embodiment.

The torque converter 10, of FIG. 1 and FIG. 2, are from my prior patent, as decribed above. With particular reference now to FIGS. 3 and 4 of the drawings. As noted, the input shaft 24 is driven by input shaft 18 from the engine/machine under control of an operator. The drive shaft 18 further provides means for indicating the the power output of the machine. Such an indication may be the revolutions per minute (R.P.M.)/ Accordingly, the present invention includes a r.p.m. indicator 100 for obtaining and providing the instantaneous r.p.m. of the power source—engine/machine, from the shaft 18.

It is to be appreciated that the power output of the engine, and hence the r.p.m., comprises many variables dependant on the machine—whether it be a lawnmower, automobile, or a heavy duty machine in road construction. These variables may include speed, breaking enertia, work force to the load, rates of movement, acceleration, interrelated machine functions, and many other factors, conditions, and parameters. Although, in most instance, the r.p.m. indicator 100 may be known-in-the-art and comprises components of conventional design. To relate the r.p.m. to that particular machine in operation, there must have taken into consideration and be imputed thereto the above noted variables, factors, and parameters. Accordingly, the output measuring signals will be integrated into a composite signal.

The hybrid signal from the r.p.m. indicator 100 is fed to a sensor 105 for further processing into a meaningful indication that is representative of the power variable of the specific engine.

The sensor 105 of a derivation of the power variable of the engine, may in a practical application, be equated to that "sensed" by the operator of the machine in a man operation. The power variable data is applied to a power computer 115. It is the function of the power computer to determine the amount of actuation of pump 140 is required to fill or drain the fluid in space 29 of the torque converter 10.

To obtain a precise amount in a continuous operation, of the filling or draining of the fluid in the space container 29 of the torque converter 10, there must be established a direct correlation between the amount of fluid in the converter 10 space 29 and the power output at shaft 18 to the input shaft 24 thereof. Accordingly, the present automatic system provides a power function computer 115 to determine the instantaneous power need—the instantaneous amount of fluid required by the function of the torque computer 10—and the instantaneous control of the pump 140 through the drive 135, to restore the power need to the engine in a closed loop electrical/electronic circuit arrangement.

It can be appreciated that a considerable amount of data and information must be predetermined. That is, the area of the space vs the the fluid in the area must be determinative of a specific power output of the converter 10. Again the amount of fluid in the space 29 must be equated to the power function—a percentage of fluid to a given horsepower. Further, the power computer 115 must be calibrated to correlate the rate of fluid flow to increase or decrease the fluid in the space 29 to the variation of output horsepower.

There is further provided in the present automatic system a data storage bank. Again as noted above, the "engine" may be a lawnmower or to the other extreme a heavy duty machine such as utilized in road construction. Accordingly, the data and information will include variables directed to the engine and will include fixed parameters directed to the application of the engine. To compliment the information of fluid in the space versus horsepower derived by the power function computer 115, the data storage bank 125 will modify and compliment the output of the power computer 115 with such data as fluid capacity in the space 29, fluid viscosity, temperature of the fluid, specific gravity, pump capacity and rate of flow, transportation lag, minimum and maximum limitations, k factors, bigger factors, and the such—again depending on the application of the the torque converter 10 to the engine. These operational functions comprise electronic circuitry and in most instances, the specific circuits—per se, are conventional and in the state-of-the-art. The combination of the circuits and their specific application to a desired function is that of the present invention.

Continuing with reference to FIG. 3, the power computer 115 provides an actuation output, such as an electrical signal, to the drive means 135. This signal will control the direction of movement of the drive means 135 and the duration of the movement of the pump 140. In this way the drive means actuates the pump 140 to fill or drain the space 29 of the converter 10. The required amount of fluid for an instantaneous power output necessitated by the work operation.

Referring now to FIG. 4, there is illustrated the automatic instantaneous control system of the present invention and generally illustrated in FIG. 3, as applied to an actual constructed embodiment of a hydrokinetic converter as described above relative to FIG. 1 and FIG. 2.

As noted above the power output of the engine drive shaft 18 is input to the converter 10 via shaft components 22/24. The power evaluation of the engine shaft 18, is continuously monitored by the r.p.m. detector 100 as above described relative to the power at shaft 18. The output from the r.p.m. indicator is applied to the sensor 105 and initiates a meaningful indication of power variable of the engine. This information indication of power variable, may in a practical application be equated to that "sensed" by the operator of the machine in a utilization of a man operated machine.

The variable data from sensor 105 is fed to the power computer 115 to determine the amount and degree of actuation of pump 45—electrical drive means 80, required to fill or drain the fluid in space 29 of the converter 10. The function and operation of power computer 115 and the data storage bank, is described above, relative to FIG. 3.

The means for draining or filling the space 29 with fluid for operation of the converter comprises a fluid supply system 82 that further includes a fluid reservoir 81. The pump 45 has an intake line 87 and a discharge line 83 which applies fluid to the space 29 of the torque converter 10 via intake 85.

Although certain and specific embodiments of the automatic system of the present invention have been shown and described relative to a specific torque converter, it is to be understood that the invention is not to be limited thereto and modifications and alterations may be had.

I claim:

1. An automatic. electrical/electronic closed loop circuit arrangement for measuring and controlling of an varying output power of a hydrokinetic torque converter being driven by an engine, with an impeller wheel connected to an input shaft and a turbine wheel connected to an output shaft and a stator wheel to provide torque multiplication between said shafts, and having a varying power input thereto derived from an output of said engine related to an instantaneous power demand of said engine comprising:

means for controlling the output rotary power of said torque converter in response to the instantaneous varying power demand of said engine, including a closed loop electrical/electronic circuit arrangement for converting multiple output signals into a composite input electrical signal,
   means to detect and measure the output power of said engine, said output power comprising a plurality of variables dependant on said engine in operation,
   a sensor operative to convert said measured output power of said detecting and measuring means into said composite electrical signal indication representative of said instantaneous varying power demand of said engine,
   a power computer operative in response to said variable composite electrical signal output power indication to instantaneously relate said composite signal indication to the instantaneous power demand of said engine;
   drive means connected to said power computer, and said control means connected to said drive means to control the direction and duration of said drive means to vary the output power of said torque converter in response to said instantaneous power demand of said engine.

2. The automatic electrical/electronic closed loop circuit arrangement of claim 1, further comprising a data storage bank operative to apply predetermined parameters to said power computer including one or more of the following: fluid capacity, specific, gravity, pump capacity and rate of flow, transportation lag, minimum and maximum limitations, K factors, and bugger factors.

3. The autocratic electrical/electronic closed loop circuit arrangement of claim 1, wherein said torque converter comprises a fluid chamber having a space equated to a power function as related to a percentage of fluid to a given horsepower of said engine, and a fluid pump means to vary the draining and filling of fluid into said chamber of said torque converter in response to the said instantaneous power demand of said engine.

4. The automatic electrical/electronic closed loop circuit arrangement of claim 1, wherein said torque converter comprises a fluid chamber and a fluid pump means connected thereto, and wherein said control means is connected to said fluid pump means to vary the draining and filling of fluid in said chamber of said torque converter.

5. The automatic electrical/electronic closed loop circuit arrangement of claim 1, wherein said sensor operative to convert said measured output power and wherein said measured output power is the r.p.m. of said output shaft of said engine.

6. The automatic electrical/electronic closed loop circuit arrangement of claim 1, wherein said power computer is connected to said sensor to thereby be responsive to the measured output power thereof.

7. The automatic electrical/electronic closed loop circuit arrangement for converting said multiple output signals into said composite input electrical signal, of claim 1, said composite input signal comprising said variables dependant on the engine, and wherein said variables may include speed, breaking inertia, work force to the load, rates of movement, acceleration, and interrelated machine functions.

8. An automatic closed loop measuring and controlling system for a hydrokinetic torque converter being driven by an engine having a varying input related to an instantaneous power demand of said engine, including a space in said converter having fluid therein equated to a percentage of fluid to a given horsepower, a fluid reservoir, a fluid pump connected thereto and a drive means to cause fluid to flow into or out of said space, comprising:

means for controlling an output power of said torque converter in response to the instantaneous varying power demand of said engine,
   means to detect and measure an output power of said engine and wherein said output power comprises a plurality of variables dependant on the engine in operation,
   sensor means operative to convert said measured output power of said detecting and measuring means to a composite electrical signal indication representative of said instantaneous varying power demand of said engine; and
   a power computer operative in response to said variable composite electrical signal power indication to instantaneously relate said electrical composite signal power indication to the instantaneous power demand of said engine; and
   electrical drive means connected to and responsive to said power computers power demand,
   control means connected to said drive means to control the direction and duration of said drive means,
   said drive means varying the amount of fluid in said space to responsively vary the output of said torque converter to said instantaneous power demand of said engine.

* * * * *